Oct. 17, 1950   W. H. SMALL   2,526,588
MOLDING APPARATUS
Filed March 22, 1946
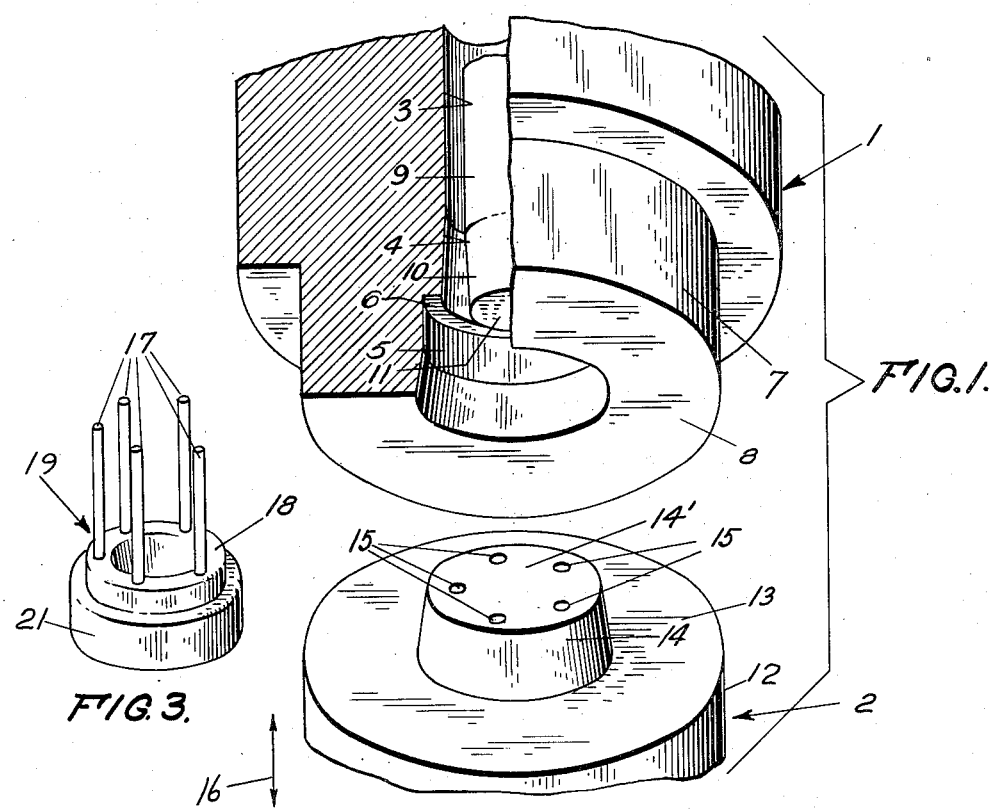
FIG. 1.
FIG. 3.
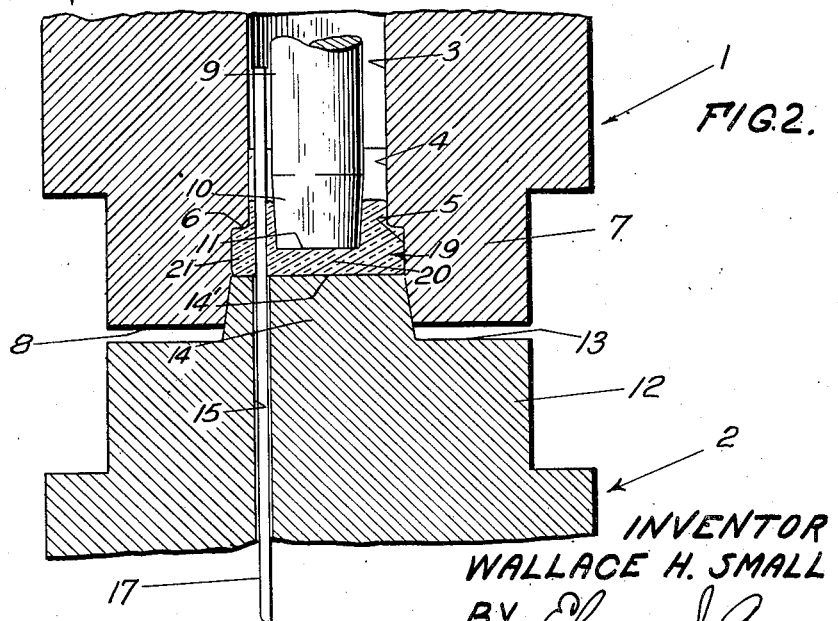
FIG. 2.
INVENTOR
WALLACE H. SMALL
BY Elmer J. Gorn
ATTY.

Patented Oct. 17, 1950

2,526,588

UNITED STATES PATENT OFFICE 2,526,588

MOLDING APPARATUS

Wallace H. Small, Waltham, Mass., assignor to Raytheon Manufacturing Company, Newton, Mass., a corporation of Delaware Application March 22, 1946, Serial No. 656,407

4 Claims. (Cl. 49—66)

This invention relates to molding apparatus, and more particularly to an apparatus for forming button-type glass seals for the lead-in wires of electron discharge tubes.

One object of this invention is to devise a mold for button-type seals by means of which a glass button of great strength may be produced.

Another object is to devise a mold of the above type by means of which a glass button may be produced which may be sealed to a tube envelope very rapidly and with a minimum amount of heat.

Another object is to devise a mold for button-type seals by the use of which a high rate of production of glass seals may be achieved.

A further object is to devise a mold of the above character which is relatively inexpensive to produce yet which is efficient in operation.

The foregoing and other objects of the invention will be best understood from the following description of an exemplification thereof, reference being had to the accompanying drawing, wherein:

Fig. 1 is a perspective view, with portions broken away, of the two portions of the mold, shown separated from each other;

Fig. 2 is a vertical section through the mold as it would appear when in use, showing the molded article therein; and Fig. 3 is a perspective view of the completed molded article.

Referring to the drawing, the upper portion of the mold is referred to generally by 1, and the lower portion by 2. The upper or female mold 1 is of generally cylindrical configuration and has a longitudinally-extending circular aperture or hole 3 therein, the center-line of this hole coinciding with the longitudinal axis of the cylinder. Adjacent its lower end, this hole is tapered outwardly to a larger diameter, as at 4. A circular aperture 5, the center-line of which coincides with the center-line of aperture 3 but which is of larger diameter than aperture 3, extends upwardly from the lower surface of cylinder 1, horizontal surface 6 joining the two apertures 3 and 5. Adjacent its lower end, aperture 5 is countersunk so that it tapers outwardly to a larger diameter at its very end. The end portion 7 of mold 1 is of reduced diameter, providing a lower circular end face 8 for said mold. A solid plunger 9, of generally cylindrical configuration, but tapering as at 10 to a lower end surface 11 of reduced diameter, is mounted in aperture 3, being longitudinally movable therein but capable of being fixed in any desired adjusted position. This plunger is of such diameter as to leave an ample area, in the shape of an annular slot, between its outer surface and the cylindrical wall bounding aperture 3.

The lower or male mold 2 is also of generally cylindrical configuration and has an upper portion 12 of reduced diameter, the diameter of this portion being the same as that of portion 7 of mold 1 and providing an upper circular end face 13 for mold 2. In the center of face 13 is an upstanding circular boss 14. This boss is made of such a diameter, and its side wall has such a taper, that when molds 1 and 2 are brought together to the extent shown in Fig. 2, where faces 8 and 13 are but slightly separated from each other, boss 14 fits into aperture 5 and intimately engages the side wall thereof. Near the outer edge of the upper face 14' of boss 14 are drilled a plurality of holes 15. The centers of these holes are all located on the circumference of a circle which has its center at the center of face 13, and the holes are shown as five in number, though any other number may be provided. These holes extend the entire length of mold 2, and are used for passage of the wires, which are to be sealed through the glass button to provide the finished article, toward the upper mold.

The mold of this invention is intended to be used for the formation of button-type seals, known also as glass buttons, for electron discharge tubes. In such buttons, a plurality of lead-in or support wires are sealed through a circular disk-like glass member to constitute the button. The wires must be sealed through the glass member in an air-tight manner. The electrode assembly is later mounted on the support wires on one side of the disk member, after which a glass envelope or bulb is placed over the electrode assembly and is sealed to the glass disk entirely around its periphery to complete the tube.

The lower mold 2 is stationary, while the upper mold 1 is movable in the direction of arrows 16, toward and away from mold 2 in a vertical direction, the longitudinal axes of molds 1 and 2 being collinear. In use of the mold to form glass buttons, the lead-in wires or support wires 17 are threaded through the holes 15 in mold 2, until they project upwardly therefrom the desired distance, the proper amount of glass is placed on boss 14, and the two molds are then brought together, as shown in Fig. 2, to mold the glass button in the required shape. As the two molds approach each other, the tapered or beveled portions 10 and 4 of plunger 9 and hole 3, respectively, will efficiently and effectively guide the upstanding wires 17 into the annular slot between plunger 9 and hole 3, thus preventing any bending or crimping of the wires.

When the molds 1 and 2 are brought together into the molding position, a continuous upstanding annular ring 18 of glass is formed around all of the wires 17 of the button, said ring being formed due to the continuous annular slot between plunger 9 and the wall of hole 3. This continuous annular ring, in addition to its functions of providing an added sealing effect for the wires and preventing the wire lengths from getting out of alignment, gives the advantage of greater stength to these buttons as compared with the buttons of the prior art, which have a separate upstanding boss around each of the wires. Such a plurality of separate bosses tends to fracture more easily than a single continuous ring.

The lower end portion or face 11 of plunger 9 extends below surface 6 of mold 1 to within a relatively short distance of face 14' of boss 14 when the molds are in the molding position of Fig. 2. This means that a central circular recess will be produced in button 19, making the central portion 20 of said button relatively thin. By making this central portion thin, strains set up in the glass due to molding and to shrinkage of the glass are materially reduced, thereby reducing breakage. By changing the position of this plunger with respect to mold 1, the amount of glass in the central portion 20 of the button may be controlled or varied.

In Fig. 2, the gap between horizontal surface 6 of mold 1 and face 14' of mold 2 allows a lower relatively wide portion 21 of glass to be formed on button 19. This lower portion 21 is thinner (that is, of smaller vertical dimensions) than that of buttons of the prior art. Due to the fact that this is so, a minimum amount of heat will be required to seal this button to a glass bulb, thus lessening the oxidation of the electrode assembly which is produced by heat.

Molds used heretofore for the formation of glass buttons have had a plurality of holes in their top halves, corresponding to the holes 15 in their bottom halves. This meant that the holes in the top mold would necessarily have to be aligned with those in the bottom mold before the wires could be inserted. However, in the present invention there is only a single continuous annular slot in the top mold 1 into which the wires go, so that the necessity of aligning two sets of holes is entirely done away with. Also, due to the fact that there is only a single opening in the top mold 1, into which the wires 17 must go, the wires can be located from the bottom mold 2 into the top mold 1 with relative ease. Then, too, the tapered or beveled portions 10 and 4, as stated above, effectively assist in guiding the wires 17 into the annular slot in the top mold. Another advantage in ease of molding obtained with the molds of the present invention is that realized by the provision of tapered beveled surfaces on the engaging portions of boss 14 and aperture 5. This feature enables the molds 1 and 2 to be more readily separated from each other when the molding process is completed.

In the finishing of the molds themselves, the mold structure of the present invention offers several advantages. In the first place, a single hole 3 is drilled in the top mold 1, rather than a plurality of holes as in other prior molds. Also, with a single annular slot there is no necessity for drilling holes in the top mold in exact alignment with the holes in the bottom mold, a procedure necessary with molds heretofore used, said procedure being extremely complicated and time-consuming.

Of course, it is to be understood that this invention is not limited to the particular details as described above, as many equivalents will suggest themselves to those skilled in the art. For example, an additional offset might be provided in the top mold to form an additional horizontal and vertical surface on button 19 for additional strength. Various other varations will suggest themselves. It is accordingly desired that the appended claims be given a broad interpretation commensurate with the scope of this invention within the art.

What is claimed is:

1. Molding apparatus including, in combination, a lower mold having an upper circular plane surface, said surface having a plurality of holes therein whose centers lie on the circumference of a circle, and an upper mold having a tapered aperture therein into which the peripheral edge of said surface is adapted to fit, said upper mold also providing therein a single annular aperture having an outside diameter substantially less than the diameter of said circular plane surface and a mean diameter substantially equal to the diameter of said circle, said two apertures being concentric.

2. Molding apparatus including, in combination, a lower mold having an upper circular plane surface, said surface having a plurality of holes therein whose centers lie on the circumference of a circle, an upper mold having a first aperture therein into which the peripheral edge of said surface is adapted to fit, said upper mold also having a second aperture therein whose diameter is substantially less than the diameter of said circular plane surface, said two apertures being concentric, and a plunger mounted concentrically in said second aperture but longitudinally adjustable therein, said plunger being of smaller diameter than said second aperture to provide an annular slot between said plunger and the wall of said second aperture, said slot having a mean diameter substantially equal to the diameter of said circle.

3. Molding apparatus including, in combination, a lower mold having an upper circular plane surface, supported on a tapered cylinder, said surface having a plurality of holes therein whose centers lie on the circumference of a circle, an upper mold having a first tapered aperture therein of limited depth into which the peripheral edge of said surface is adapted to be inserted to a limited distance, said depth being greater than said distance, said upper mold also having a second elongated aperture therein whose diameter is substantially less than the diameter of said circular plane surface, said two apertures being concentric, and a tapered plunger mounted concentrically in said second aperture but longitudinally adjustable therein, said plunger being of smaller diameter than said second aperture to provide an annular slot between said plunger and the wall of said second aperture, said slot having a mean diameter substantially equal to the diameter of said circle, the normal position of the lower end of said plunger being below the bottom of said second aperture.

4. Molding apparatus including, in combination, a lower mold having an upper circular plane surface, said surface having a plurality of holes therein whose centers lie on the circumference of a circle, an upper mold having a first aperture therein of limited depth into which the peripheral edge of said surface is adapted to be inserted to a limited distance, said depth being greater than said distance, said upper mold also having a second elongated aperture therein whose diameter is substantially less than the diameter of said circular plane surface, said two apertures being concentric, and a cylindrical plunger mounted concentrically in said second aperture but longitudinally adjustable therein, said plunger being of smaller diameter than said second aperture to provide an annular slot between said plunger and the wall of said second aperture, said slot having a mean diameter substantially equal to the diameter of said circle, the normal position of the lower end of said plunger being below the bottom of said second aperture, and the plunger being of frusto-conical configuration at its lower free end.

WALLACE H. SMALL.

REFERENCES CITED

The following references are of record in the file of this patent:

UNITED STATES PATENTS

| Number | Name | Date |
|---|---|---|
| 1,965,408 | Eden et al. | July 3, 1934 |
| 2,324,385 | Gustin et al. | July 13, 1943 |
| 2,334,784 | Miller | Nov. 23, 1943 |